(12) United States Patent
Park et al.

(10) Patent No.: US 11,320,093 B2
(45) Date of Patent: May 3, 2022

(54) HEAT CIRCULATION HYDROGEN STORING METHOD USING SOLID STATE HYDROGEN STORAGE MATERIAL

(71) Applicants: HYUNDAI MOTOR COMPANY, Seoul (KR); KIA MOTORS CORPORATION, Seoul (KR)

(72) Inventors: Ji Hye Park, Seoul (KR); Dong Hoon Nam, Suwon-si (KR); Hoon Mo Park, Seongnam-si (KR); Kyung Moon Lee, Uiwang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 82 days.

(21) Appl. No.: 16/998,603

(22) Filed: Aug. 20, 2020

(65) Prior Publication Data

US 2021/0156519 A1    May 27, 2021

(30) Foreign Application Priority Data

Nov. 26, 2019 (KR) .......................... 10-2019-0152927

(51) Int. Cl.
*F17C 13/02* (2006.01)
*F17C 11/00* (2006.01)

(52) U.S. Cl.
CPC .......... *F17C 13/025* (2013.01); *F17C 11/005* (2013.01); *F17C 13/026* (2013.01);
(Continued)

(58) Field of Classification Search
CPC .... F17C 13/025; F17C 13/026; F17C 11/005; F17C 2221/03; F17C 2225/033; F17C 2225/04; F17C 2270/01
See application file for complete search history.

(56) References Cited

U.S. PATENT DOCUMENTS 5,122,338 A * 6/1992 Wallace .................. F25B 17/12
                                                        420/416
6,672,078 B2   1/2004 Ovshinsky et al.
(Continued)

FOREIGN PATENT DOCUMENTS

JP         5234898 B2      7/2013
KR    2017-0020840 A       2/2017
KR    2017-0104254 A       9/2017

OTHER PUBLICATIONS

Lototskyy, M.V., et al., "Metal hydride hydrogen compressors: A review," International Journal of Hydrogen Energy, vol. 3, pp. 5818-5851, 2014.

*Primary Examiner* — Jason K Niesz
(74) *Attorney, Agent, or Firm* — McDonnell Boehnen Hulbert & Berghoff LLP

(57) ABSTRACT

Disclosed is a hydrogen storing method having improved energy efficiency by efficiently reusing heat through a heat circulation structure. Specifically, the hydrogen storing method includes supplying hydrogen by the supply device, compressing hydrogen received from the supply device by a compression device, receiving the hydrogen compressed by the compression device and storing the same in a storage device, and transferring heat generated from the storage device to the compression device, wherein the compression device and the storage device each include solid state hydrogen storage materials that cause an exothermic reaction when hydrogen is stored and an endothermic reaction when hydrogen is released.

7 Claims, 1 Drawing Sheet

(52) U.S. Cl.
CPC .... *F17C 2221/03* (2013.01); *F17C 2225/033* (2013.01); *F17C 2225/04* (2013.01); *F17C 2270/01* (2013.01)

(56) References Cited

U.S. PATENT DOCUMENTS

| | | | |
|---|---|---|---|
| 6,733,741 B2 * | 5/2004 | Nakamura | C01B 3/0005 |
| | | | 423/658.3 |
| 2006/0180235 A1 * | 8/2006 | Kubo | B60H 1/00257 |
| | | | 141/82 |
| 2011/0100356 A1 | 5/2011 | Bliesner | |

* cited by examiner

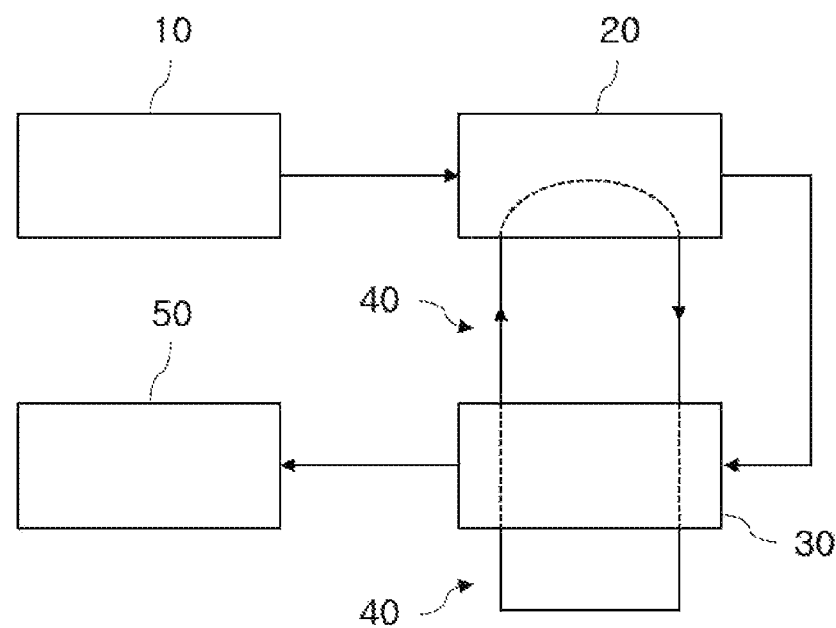

HEAT CIRCULATION HYDROGEN STORING METHOD USING SOLID STATE HYDROGEN STORAGE MATERIAL

CROSS REFERENCE TO RELATED APPLICATIONS

The present application claims priority to Korean Patent Application No. 10-2019-0152927, filed Nov. 26, 2019, the entire contents of which is incorporated herein for all purposes by this reference.

BACKGROUND

Field

The present disclosure relates to a hydrogen storing method having improved energy efficiency by reusing heat which is generated from a hydrogen compressor based on solid hydrogen storing material through a heat circulation structure.

Description of the Related Art

The use of non-renewable fossil energy as an energy source has rapidly increased due to an acceleration of industrialization. Accordingly, the non-renewable fossil energy is at risk of being depleted. In addition, harmful substances produced during combustion deteriorate a situation where the environment and natural ecosystems are threatened.

Hydrogen may be continuously produced, as a renewable energy source that has emerged to resolve this situation, from abundant water present anywhere on the earth. Accordingly, there is no need to worry about the depletion of the raw material of the hydrogen. In addition, the hydrogen is clean energy, which produces almost no pollutants when burned and is an element to produce water again.

In order to supply such hydrogen gas as a fuel, a hydrogen storage device is necessary. There are three typical methods largely used in the hydrogen storage device: a high pressure gas storing method, a liquid hydrogen storing method, and a solid hydrogen storing method.

The high pressure gas storing method is the most common way to store high pressure gas at 700 bar but has a disadvantage of low storage density per unit volume and a risk due to high pressure.

The liquid hydrogen storing method has an advantage of storing a large amount of hydrogen by liquefying hydrogen. However, there is a disadvantage in that the cryogenic temperature should be maintained due to the liquefaction of hydrogen gas at the cryogenic temperature.

On the other hand, the solid hydrogen storing method is a method in which hydrogen gas is reacted to and stored into a solid material that is for storing hydrogen, and which is carried out at relatively low pressure compared to the high pressure gas storing method. In addition, in contrast to the liquid hydrogen storing method, the solid hydrogen storing method is carried out at high temperature rather than cryogenic temperature, so it is relatively easy to develop, and the storage amount of the hydrogen gas is large.

However, in a conventional solid hydrogen storing method, a separate heat exchanger is required for storing hydrogen in a hydrogen storage material or releasing hydrogen from the hydrogen storage material. Such a device and process is difficult to realize due to a complicated structure and has a problem of high manufacturing cost.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a heat circulation hydrogen storing method capable of improving energy efficiency by efficiently reusing heat through a heat circulation structure.

The objective of the present disclosure is not limited to the above-mentioned objective. In addition, the objective of the present disclosure will become more apparent from the following description, and will be realized by the means described in the claims and combinations thereof.

In order to achieve the above objective according to one aspect of the present disclosure, there is provided a hydrogen storing method, the method including supplying hydrogen by a supply device, compressing the hydrogen transferred from the supply device by a compression device, receiving the hydrogen compressed by the compression device and storing the same in a storage device, and transferring heat generated from the storage device to the compression device, wherein the compression device and the storage device each may include solid state hydrogen storage materials that cause an exothermic reaction when hydrogen is stored and an endothermic reaction when hydrogen is released.

The supply device may supply hydrogen at a pressure of more than two bar.

The solid state hydrogen storage material may include a compound represented by chemical formula 1 below, $$MH_x \qquad \text{Chemical formula 1:}$$

where, M is selected among Mg, BaRe, KB, NaAl, NaB, Li, LiN, LiB, $Mg_2Ni$, $LaNi_5$, Fe Ti, $FeMn_2$, $NH_3B$, and N, and x is 0.9 to 10.

The compression device may release hydrogen stored in the solid state hydrogen storage material into a confined space, thereby compressing the hydrogen to at least 10 bar.

Heat may be exchanged between the compression device and the storage device through a fluid flowing through a closed flow path loop installed between the compression device and the storage device.

The heat generated from the storage device while hydrogen is stored in the storage device may be transferred to the compression device through the fluid, and the transferred heat may cause hydrogen to be released from the solid state hydrogen storage material of the compression device.

The method may further include releasing hydrogen from the solid state hydrogen storage material of the storage device by transferring heat, generated from the compression device while hydrogen is stored in the compression device, to the storage device through the fluid.

As described above, the hydrogen storing method according to the present disclosure effectively reuses heat generated in a storage and release process of the hydrogen through heat circulation between the compression device and the storage device, thereby greatly improving energy efficiency.

The effects of the present disclosure are not limited to the effects mentioned above. Rather, it is to be understood that the effects of the present disclosure include all the effects deducible from the description below.

BRIEF DESCRIPTION OF THE FIGURES

FIG. 1 is a view schematically showing a hydrogen storage system according to the present disclosure.

DETAILED DESCRIPTION

The above objectives, other objectives, features, and advantages of the present disclosure will be readily understood through the following exemplary embodiments associated with the accompanying drawing. However, the present disclosure is not limited to the embodiments described herein and may be embodied in other forms. Rather, the embodiments introduced herein are provided so that the disclosure may be made thorough and complete and to fully convey the spirit of the present disclosure to those skilled in the art.

In describing the drawing, similar reference numerals are used for similar elements. In the accompanying drawing, the dimensions of the structures are shown in a larger scale than actual for clarity of the disclosure. Terms such as first, second, and the like may be used to describe various components, but the components should not be limited by the terms. The terms are used only for the purpose of distinguishing one component from another. For example, without departing from the scope of the present disclosure, the first component may be referred to as the second component, and similarly, the second component may also be referred to as the first component. Singular expressions include plural expressions unless the context clearly indicates otherwise.

The terms "comprise", "have", or the like used in the present specification is intended to indicate a presence of a feature, number, step, action, component, part, or combination thereof described in the specification; and is to be understood not to exclude the possibility of the presence or the addition of at least one of the numbers, steps, operations, components, parts, or combinations thereof. when a part such as a layer, film, region, plate, or the like is said to be "on" another part, it includes not only a case where the one part is put directly on another part but also a case where yet another part is therebetween. On the contrary, when a part such as a layer, film, region, plate, or the like is said to be "below" another part, it includes not only a case where the one part is put directly below another part but also a case where yet another part is therebetween.

FIG. 1 is a view schematically showing a hydrogen storage system according to the present disclosure. With reference to FIG. 1, the hydrogen storage system includes a supply device 10 configured to supply hydrogen, a compression device 20 configured to receive hydrogen from the supply device 10 and to compress the hydrogen to have a predetermined pressure, a storage device 30 configured to receive the compressed hydrogen from the compression device 20 and to store the same, and a heat exchange device 40 including a closed flow path loop configured to provide heat exchange between the compression device 20 and the storage device 30.

The supply device 10 may be configured to store and supply hydrogen or to produce and supply hydrogen. For example, the former may be a hydrogen storage tank, and the latter may be a water electrolysis system or a reforming system.

The compression device 20 may be a general compressor that compresses gas but may use a compressor configured to include a solid state hydrogen storage material. Specifically, the compression device 20 may include the solid state hydrogen storage material that is a compound represented by chemical formula 1 below. The hydrogen may be pressurized to a predetermined pressure using the compression device 20 including the solid state hydrogen storage material, which will be described later.

Chemical formula 1:
$$MH_x$$

where, M is selected among Mg, BaRe, KB, NaAl, NaB, Li, LiN, LiB, $Mg_2Ni$, $LaNi_5$, Fe Ti, $FeMn_2$, $NH_3B$, and N, and x is 0.9 to 10.

The storage device 30 is configured to store the hydrogen supplied from the compression device 20 in a solid state hydrogen storage material or to release the stored hydrogen to supply to a place where it can be used 50, such as fuel cell, vehicle, or hydrogen station, for example. The solid state hydrogen storage material is a substance that causes an exothermic reaction when hydrogen is stored, and an endothermic reaction when hydrogen is released. Thus, when the hydrogen is stored in the solid state hydrogen storage material in the storage device 30, heat is generated therefrom. The solid state hydrogen storage material of the storage device 30 may include a compound represented by the chemical formula 1 above. The solid state hydrogen storage material of the storage device 30 may be the same as, or different from, that of the compression device 20.

The present disclosure does not dissipate the heat released from the solid state hydrogen storage material to the outside, but circulates the same in the hydrogen storage system, thereby improving heat efficiency. Specifically, a kind of closed flow path loop circulating between the compression device 20 and the storage device 30 is installed, and the heat exchange device 40 is configured to allow a fluid capable of carrying heat therein to flow, thereby improving the thermal efficiency. In addition, as described above, because the compression device 20 also includes the solid state hydrogen storage material, heat is also generated when the hydrogen is stored in the compression device 20. Therefore, the heat generated from the compression device 20 may be circulated to the storage device 30 and be used to release the hydrogen stored in the storage device 30. This will be described in more detail in a hydrogen storing method according to the present disclosure.

The hydrogen storing method using the hydrogen storage system includes supplying hydrogen by a supply device 10, compressing hydrogen received from the supply device 10 by a compression device 20, receiving the hydrogen compressed by the compression device 20 and storing the same in a storage device 30, and transferring heat generated from the storage device 30 to the compression device 20.

The supply device 10 may be a device supplying hydrogen at a pressure of two bar to eight bar. Because a source of supply has a limitation in supplying hydrogen at high pressure, the hydrogen is generally supplied at the above-mentioned low pressure. Therefore, in order to store the hydrogen supplied from the supply device 10, it is necessary to compress the hydrogen to high pressure using the compression device 20.

The compression device 20 is a device including the solid state hydrogen storage material and specifically, may be a chamber having a predetermined space in which the solid state hydrogen storage material is filled. When a certain amount of heat is applied to the compression device 20, the hydrogen is released from the solid state hydrogen storage material.

In addition, the hydrogen supplied from the supply device 10 is introduced into the chamber along with the released hydrogen. That is, since hydrogen is filled in the predetermined space, the pressure of the hydrogen becomes increased. At this time, the heat supplied to release the hydrogen from the solid state hydrogen storage material filled in the compression device 20 uses the heat released from the storage device 30. That is, the heat released when hydrogen is stored in the solid state hydrogen storage material of the storage device 30 is collected through the heat exchange device 40 and transferred to the compression device 20, thereby allowing the heat to circulate in the hydrogen storage system.

The compression device 20 may compress the hydrogen to a high pressure of at least 10 bar.

Thereafter, the hydrogen compressed by the compression device 20 is supplied to the storage device 30, and the storage device 30 stores the hydrogen.

In addition, the hydrogen storing method may further include releasing the hydrogen stored in the solid state hydrogen storage material of the storage device 30 by collecting heat, which is generated during hydrogen storage from the compression device 20, through the heat exchange device 40 and transferring the same to the storage device 30.

The hydrogen storing method according to the present disclosure allows the compression device 20 and the storage device 30 respectively to be filled with the solid state hydrogen storage materials. In addition, when the solid state hydrogen storage material releases heat or requires heat in the corresponding process of absorbing or discharging the hydrogen, the hydrogen storing method allows necessary conditions to be met by appropriately circulating the heat generated in the system, thereby improving thermal efficiency. Hereinafter, this will be described for each situation.

First, a method for storing the hydrogen in the storage device 30 will be described. The hydrogen is compressed to at least 10 bar by the compressor 20 and introduced into the storage device 30. At this time, the heat is generated while the hydrogen is stored in the solid state hydrogen storage material filled in the storage device 30. Then, fluid flowing through a closed flow path loop installed between the compression device 20 and the storage device 30 receives heat released from the storage device 30 and transmits the heat to the compression device 20. In the compression device 20 to which the heat has been transferred, a large amount of hydrogen is released from the solid state hydrogen storage material, whereby as described above the hydrogen may be compressed to higher pressure.

Next, a method for releasing the hydrogen from the storage device 30 will be described. When heat is applied to the storage device 30, the hydrogen is released from the solid state hydrogen storage material. The heat applied to the storage device 30 may be supplied from the compression device 20. Specifically, when the hydrogen stored in the solid state hydrogen storage material filled in the compression device 20 is depleted, the hydrogen must be stored again. That is, when the supply device 10 supplies the hydrogen at a predetermined pressure to the compression device 20 and the compression device 20 stores hydrogen in the solid state hydrogen storage material, heat is generated from the solid state hydrogen storage material. When the heat of the compression device 20 is absorbed through the fluid flowing through the closed flow path loop and supplied to the storage device 30, the hydrogen stored in the storage device 30 may be released.

The present disclosure has been described in detail above. However, the scope of a right of the present disclosure is not limited to the above description, and various modifications and improvements of those skilled in the art using the basic concept of the present disclosure defined in the following claims are also included in the scope of the right of the present disclosure.

The invention claimed is:

1. A hydrogen storing method, the method comprising:
   supplying hydrogen by a supply device;
   compressing the hydrogen transferred from the supply device by a compression device;
   receiving the hydrogen compressed by the compression device and storing the same in a storage device; and
   transferring heat generated from the storage device to the compression device;
   wherein the compression device and the storage device each include solid state hydrogen storage materials that cause an exothermic reaction when hydrogen is stored and an endothermic reaction when hydrogen is released.

2. The method of claim 1, wherein the supply device supplies hydrogen at a pressure of two bar to eight bar.

3. The method of claim 1, wherein the solid state hydrogen storage material includes a compound represented by a chemical formula $$MH_x,$$

where M is selected among Mg, BaRe, KB, NaAl, NaB, Li, LiN, LiB, $Mg_2Ni$, $LaNi_5$, FeTi, $FeMn_2$, $NH_3B$, and N, and x is 0.9 to 10.

4. The method of claim 1, wherein the compression device releases hydrogen stored in the solid state hydrogen storage material into a confined space, thereby compressing the hydrogen to at least 10 bar.

5. The method of claim 1, wherein, through a fluid flowing through a closed flow path loop installed between the compression device and the storage device, heat is exchanged between the compression device and the storage device.

6. The method of claim 5, wherein the heat generated from the storage device while hydrogen is stored in the storage device is transferred to the compression device through the fluid, and the transferred heat causes hydrogen to be released from the solid state hydrogen storage material of the compression device.

7. The method of claim 5, further comprising:
   releasing hydrogen from the solid state hydrogen storage material of the storage device by transferring heat, generated from the compression device while hydrogen is stored in the compression device, to the storage device through the fluid.

* * * * *